April 29, 1969 J. J. PASTORIZA 3,441,913
MULTIPLE SIGNAL SAMPLING AND STORAGE ELEMENTS SEQUENTIALLY DISCHARGED THROUGH AN OPERATIONAL AMPLIFIER
Filed April 12, 1966
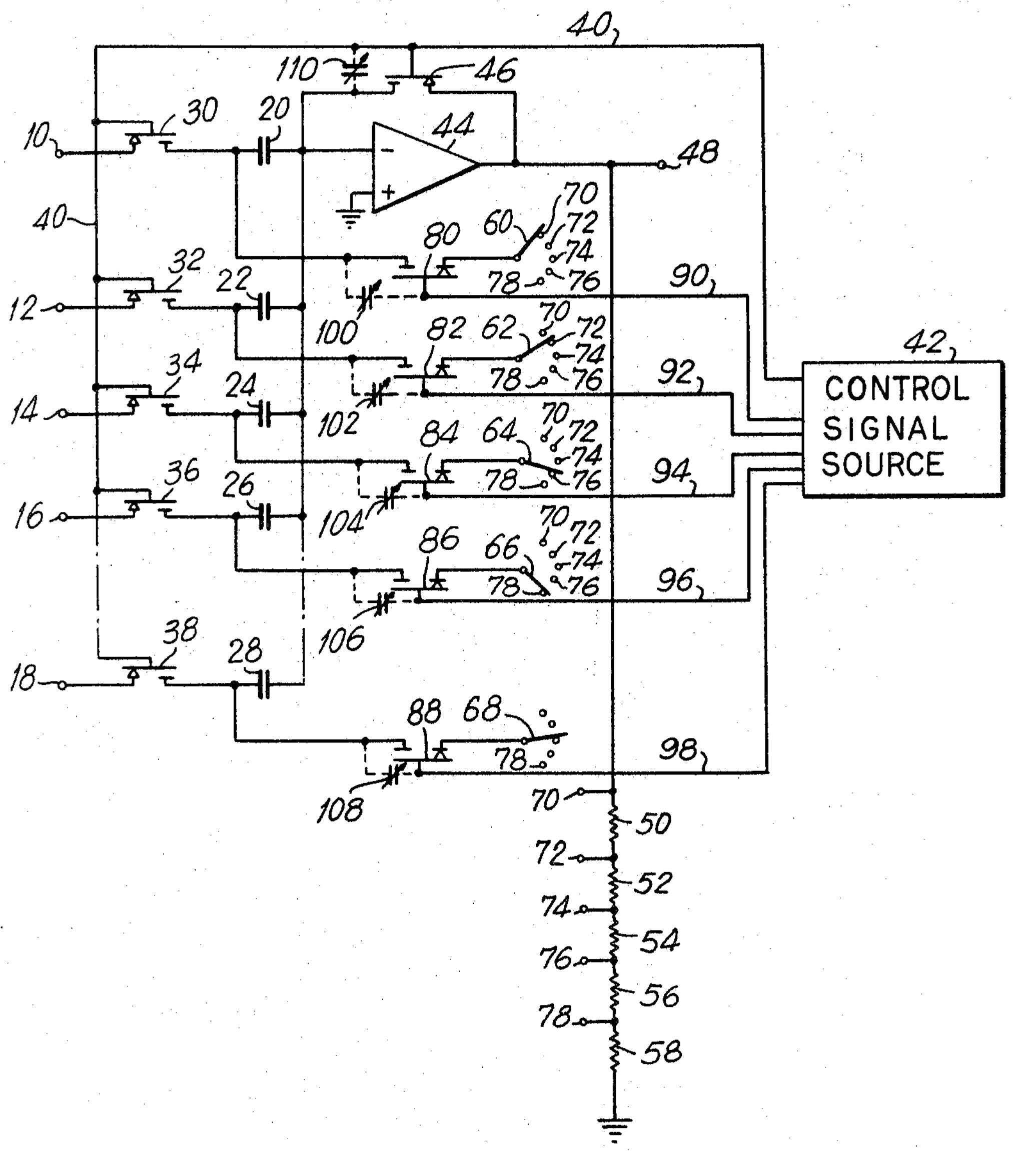
INVENTOR.
JAMES J. PASTORIZA
BY
Curtis, Morris + Safford
ATTORNEYS United States Patent Office 3,441,913
Patented Apr. 29, 1969

3,441,913

MULTIPLE SIGNAL SAMPLING AND STORAGE ELEMENTS SEQUENTIALLY DISCHARGED THROUGH AN OPERATIONAL AMPLIFIER

James J. Pastoriza, Old Farm Road, Lincoln, Mass. 01773

Filed Apr. 12, 1966, Ser. No. 542,028
Int. Cl. G11b 9/00
U.S. Cl. 340—173 12 Claims The present invention relates, in general, to signal processing apparatus. More particularly, the invention relates to signal sampling apparatus especially useful, for example, in a multiplexing arrangement in which a plurality of input signals are sampled and the sampled quantities are stored and subsequently read out in a predetermined sequence.

It will be readily apparent from the following description that the signal sampling apparatus of the present invention has a wide variety of applications. One typical application is that of sampling a plurality of inputs simultaneously and storing the sampled quantities for a prescribed period of time. Subsequently, the stored quantities are read out in a sequence with a speed compatible with an analog-to-digital converter for conversion and use in a digital computer programmed for signal analysis. Another application is the sampling and holding of high speed waveform information. Instantaneous values of the waveforms at different times can be sampled and held for later slow examination by a digital voltmeter or other instruments.

Capacitors are most commonly used as the storage elements in applications such as those described above. In order to provide read outs which most accurately represent the sampled quantities, it is important that the storage capacitors leak very little. Operational amplifiers may be employed with advantage to insure proper operation of the storage capacitors and also to deliver output signals with sufficient power and at low impedance. However, a well known problem of operational amplifiers is the presence of a signal known as offset. Offset is a small bias current and voltage inherently required by the operational amplifier which is due to slight imbalances at the input stages and which shows up as an output voltage error. The offset effect is not necessarily constant but instead may drift, so that it may not be compensated for simply by adding a constant factor to the output. The apparatus of the present invention includes a high gain circuit which utilizes an operational amplifier in which compensation is provided for the offset of the operational amplifier.

Accordingly, it is an object of the present invention to provide new and improved circuitry which employs an operational amplifier in which compensation is provided for operational amplifier offset.

It is another object of the present invention to provide new and improved signal sampling apparatus.

It is a further object of the present invention to provide signal sampling apparatus employing an operational amplifier in which compensation is provided for operational amplifier offset.

It is yet a further object of the present invention to provide apparatus of the character described which is relatively simple in construction, inexpensive to fabricate and has a wide variety of applications.

Briefly stated, the apparatus of the present invention includes a plurality of capacitors which serve to store information derived from a plurality of input signals which are sampled simultaneously. These capacitors subsequently are read out through an operational amplifier in a predetermined sequence. Operational amplifier offset is compensated for by first coupling the output of the operational amplifier to one side of the capacitors during sampling to store the effect of offset and subsequently coupling the output of the operational amplifier to the other sides of the capacitors as they are being read out. The result is that the effect of offset during read out is opposed to its effect during sampling so that offset is cancelled as each capacitor is read out.

For a better understanding of the present invention, together with other and further objects thereof, reference is made to the following description, taken in connection with the accompanying drawing, and its scope will be pointed out in the appended claims.

Referring to the drawing there is shown a circuit diagram of one embodiment of signal sampling apparatus constructed in accordance with the present invention.

Input signals to be sampled are available at a plurality of input terminals 10, 12, 14, 16 and 18. These input signals may be, for example, five signals supplied from a multi-channel tape recorder which are representative of five parameters to be sampled at prescribed times.

The input signals are sampled by individually connecting the input terminals 10, 12, 14, 16 and 18 to the left-hand sides of capacitors 20, 22, 24, 26 and 28, respectively, by means of field effect transistors (MOSFETS) 30, 32, 34, 36 and 38, respectively, for a prescribed period of time. The field effect transistors are normally nonconductive and serve as normally open switching elements which are rendered conductive and closed when the respective gate electrodes are supplied with control signals along a conductor 40 from a control signal source 42. The arrangement is such that these control signals are supplied to the field effect transistors 30 through 38, inclusive, simultaneously so that the input signals at the input terminals 10 through 18, inclusive, are coupled to the capacitors 20 through 28, inclusive, and sampled simultaneously. A typical sampling interval, that is, the time during which the input terminals are connected to the capacitors, is four microseconds.

The signal sampling apparatus further includes an operational amplifier 44 of conventional construction and operation. The right-hand sides of the capacitors 20 through 28, inclusive, are connected together and to the negative summing point of the operational amplifier 44. The positive summing point of the operational amplifier 44 is shown connected to ground.

Connected between the output terminal 48 of the operational amplifier 44 and its negative summing point is a field effect transistor 46. This field effect transistor also is normally nonconductive and serves as a normally open switching element which is rendered conductive and closed by the control signals which are supplied to the field effect transistors 30 through 38, inclusive. As a result, the output terminal 48 of the operational amplifier 44 is connected to its negative summing point at the same times and for the same time duration as the input terminals 10 through 18, inclusive, are connected to the capacitors 20 through 28, inclusive. Thus, during the sampling of the input signals and while the input signals are being coupled to the left-hand sides of the capacitors 20 through 28, inclusive, the output terminal 48 of the operational amplifier 44 is connected to the right-hand sides of the capacitors. This has the effect of applying the offset of the operational amplifier 44 to the right-hand sides of the capacitors so that the net signal stored by each of the capacitors is representative of its associated input signal, at the time of sampling, plus the offset of the operational amplifier.

A plurality of resistors 50, 52, 54, 56 and 58 are connected between the output terminal 48 and ground. A plurality of selector switches 60, 62, 64, 66 and 68, one associated with each of the capacitors 20, 22, 24, 26 and 28, respectively, are arranged to contact any of the switch contacts 70, 72, 74, 76 and 78 connected to the output terminal 48 and the junctions of resistors 50 through 58, inclusive. The actual connections between the switch contacts 70 through 78, inclusive, and the respective resistors 50 through 58, inclusive, have been omitted from the drawing for the sake of clarity. The purpose of the selector switches 60 through 68, inclusive, and the resistors 50 through 58, inclusive, will be considered in more detail hereinafter.

Connected between the selector switches 60 through 68, inclusive, and the left-hand sides of the capacitors 20 through 28, inclusive, is a second plurality of field effect transistors 80, 82, 84, 86 and 88. These field effect transistors are normally nonconductive and serve as normally open switching elements which are rendered conductive and closed when the respective gate electrodes are supplied with control signals along conductors 90, 92, 94, 96 and 98 from the control signal source 42. As a result, the output terminal 48 is coupled to the left-hand side of that capacitor in the group 20 through 28, inclusive, associated with the field effect transistor in the group 80 through 88, inclusive, which has been rendered conductive. When any of the field effect transistors 80 through 88, inclusive, are rendered conductive, the feedback path of the operational amplifier 44 is complete with the result that the information stored by the associated capaciors 20 through 28, inclusive, is read out through the operational amplifier. Because the output terminal 48 is coupled to the left-hand side of capacitors 20 through 28, inclusive, during read out, whereas the output terminal 48 was previously coupled to the right-hand sides of these capacitors during sampling, the effect of offset during read out is opposed to the effect of offset during sampling with the result that offset is effectively cancelled during read out of the capacitors. The desired signals, truly representative of the information stored by the capacitors 20 through 28, inclusive, are available at the output terminal 48. Althouh the offset may drift, this drift is slow, so that there is virtually no change in offset in a single cycle between sampling and read out and the desired cancellation effects are achieved.

The capacitors 20 through 28, inclusive, are read out in any predetermined sequence in accordance with the sequence of the control signals supplied along the conductors 90 through 98, inclusive, from the control signal source 42. A typical read out interval, that is the time during which the output terminal 48 is connected to the lef-hand side of any of the capacitors 20 through 28, inclusive, is twenty microseconds.

It will be readily apparent that the control signal source 42 may be a circuit of conventional design employing conventional components which is capable of supplying pulses of prescribed durations at prescribed times to control the operations of the signal sampling apparatus.

The resistors 50 through 58, inclusive, and the selector switches 60 through 68, inclusive, provide variable gains for the input signals. This feature is particularly advantageous where the range of input signal amplitudes is great, while the dynamic range of the utilizing equipment connected to the output terminal 48 is small. By connecting the selector switches to particular junctions of the resistors 50 through 58, inclusive, dependent upon the amplitudes of the corresponding input signals, the gain of the apparatus for each input signal is set so that the resulting output signals fall within the desired range.

Among the advantages in using MOSFETS as the switching elements is that MOSFETS do not develop an offset signal. In addition, MOSFETS provide isolation between the gating signal and the gated signal. The relatively large series resistance of MOSFETS presents no problems since sufficient time is provided during the sampling intervals to charge the storage capacitors.

Another important advantage of the disclosed apparatus is that a single amplifier (operational amplifier 44) and a single variable gain resistor network (resistors 50 through 58, inclusive) may be shared by a plurality of sampling channels. Besides providing a significant savings in the cost of the circuitry, this arrangement also minimizes problems of calibration.

It has been found advantageous in some applications to provide a plurality of adjustable trim capacitors 100 through 110, inclusive, as shown connected by dotted lines between the gate and drain electrodes of field effect transistors 80 through 88, inclusive, and field effect transistor 46. These capacitors serve to balance the effects of capacitive coupling between the electrodes of the respective field effect transistors, and make possible a very precise zero-set for each individual channel without the need of selecting transistors.

While there has been described what is at present considered to be the preferred embodiment of this invention it will be obvious to those skilled in the art that various changes and modifications may be made therein without departing from the invention and it is, therefore, aimed to cover all such changes and modifications as fall within the true spirit and scope of the invention.

What is claimed is:

1. Signal sampling apparatus comprising:

a plurality of input signal sources for supplying a plurality of input signals;

an operational amplifier;

a plurality of storage elements, one for each of said input signal sources, adapted to be connected first between said input signal sources and the input of said operational amplifier for a first time interval and second between the output of said operational amplifier and said input of said operational amplifier for a second time interval;

first switching means for simultaneously connecting said storage elements between said input signal sources and said input of said operational amplifier and coupling said output of said operational amplifier to said input of said operational amplifier for said first time interval, whereby said storage elements store signals representative of their associated input signals plus the offset of said operational amplifier;

and second switching means for sequentially connecting said storage elements between said output of said operational amplifier and said input of said operational amplifier for said second time interval.

2. Signal sampling apparatus comprising:

means for supplying a plurality of input signals;

an operational amplifier;

a plurality of capacitors, one for each of said input signals, a first side of each of said capacitors connected to the input of said operational amplifier and a second side of each of said capacitors adapted to be connected first to receive its associated input signal during a first time interval and second to the output of said operational amplifier during a second time interval;

first switching means for simultaneously coupling all said input signals to the second sides of their associated capacitors and said output of said operational amplifier to said input of said operational amplifier for said first time interval;

and second switching means for sequentially coupling said output of said operational amplifier to said second sides of said capacitors for said second time interval.

3. Signal sampling apparatus according to claim 2 wherein the second switching means include a plurality of normally nonconductive electronic valves which are rendered conductive for the second time interval by control signals supplied in a predetermined sequence to sequentially couple the output of the operational amplifier to the second sides of the capacitors for said second time interval.

4. Signal sampling apparatus according to claim 3 wherein the electronic valves are field effect transistors.

5. Signal sampling apparatus according to claim 4 wherein the first switching means include a second plurality of normally nonconductive electronic valves which are simultaneously rendered conductive for the first time interval by a control signal to couple the input signals to the second sides of their associated capacitors and to couple the output of the operational amplifier to the input of said operational amplifier for said first time interval.

6. Signal sampling apparatus according to claim 5 wherein the second plurality of electronic valves are field effect transistors.

7. A high gain circuit comprising:
an input signal source for supplying an input signal;
an operational amplifier;
a storage element adapted to be connected first between said input signal source and the input of said operational amplifier for a first time interval and second between the output of said operational amplifier and said input of said operational amplifier for a second time interval;
first switching means for simultaneously connecting said storage element between said input signal source and said input of said operational amplifier and coupling said output of said operational amplifier to said input of said operational amplifier for said first time interval, whereby said storage element stores a signal representative of said input signal plus the offset of said operational amplifier;
and second switching means for connecting said storage element between said output of said operational amplifier and said input of said operational amplifier for said second time interval.

8. A high gain circuit according to claim 7 wherein the storage element is a capacitor.

9. A high gain circuit according to claim 8 wherein:
the first switching means include first and second normally nonconductive electronic valves which are rendered conductive simultaneously for the first time interval by a first control signal to connect the capacitor between the input signal source and the input of the operational amplifier and to couple the output of said operational amplifier to said input of said operational amplifier; and
the second switching means include a third normally nonconductive electronic valve which is rendered conductive for the second time interval by a second control signal to connect said capacitor between said output of said operational amplifier and said input of said operational amplifier.

10. Signal sampling apparatus comprising:
a plurality of input signal sources for supplying a plurality of input signals;
an operational amplifier;
a plurality of storage elements, one for each of said input signal sources, adapted to be coupled first between said input signal sources and the input of said operational amplifier for a first time interval and second between the output of said operational amplifier and said input of said operational amplifier for a second time interval;
first switching means for simultaneously coupling said storage elements between said input signal sources and said input of said operational amplifier and coupling said output of said operational amplifier to said input of said operational amplifier for said first time interval, whereby said storage elements store signals representative of their associated input signals plus the offset of said operational amplifier;
a plurality of series connected resistors connected to said output of said operational amplifier;
and second switching means for sequentially coupling said storage elements between selected junctions of said series connected resistors and said input of said operational amplifier for said second time interval.

11. Signal sampling apparatus according to claim 10 wherein the storage elements are capacitors.

12. Signal sampling apparatus according to claim 11 wherein the second switching means include:
a plurality of normally nonconductive electronic valves which are rendered conductive for the second time interval by control signals supplied in a predetermined sequence for sequentially coupling the capacitors between the output of the operational amplifier and the input of said operational amplifier; and
a plurality of selector switches for connecting said electronic valves to selected junctions of the series connected resistors.

References Cited

UNITED STATES PATENTS

| | | | |
|---|---|---|---|
| 3,098,214 | 7/1963 | Windes et al. | 320—1 X |
| 3,193,803 | 7/1965 | Hoffman | 320—1 X |
| 3,363,113 | 1/1968 | Bedingfield | 328—151 X |

BERNARD KONICK, *Primary Examiner.*

J. F. BREIMAYER, *Assistant Examiner.*

U.S. Cl. X.R.

307—294; 320—1; 328—104, 154; 340—347